Feb. 26, 1924.

R. B. VINCENT

FODDER TIE

Filed Sept. 17, 1923

1,484,688

Inventor
Robert B. Vincent
By Adam E. Fisher
Attorney

Patented Feb. 26, 1924.

1,484,688

UNITED STATES PATENT OFFICE.

ROBERT B. VINCENT, OF KEOTA, IOWA.

FODDER TIE.

Application filed September 17, 1923. Serial No. 663,074.

*To all whom it may concern:*

Be it known that ROBERT B. VINCENT, a citizen of the United States, residing at Keota, in the county of Keokuk and State of Iowa, has invented certain new and useful Improvements in Fodder Ties, of which the following is a specification.

The invention relates to improvements in means for tying shocks of corn fodder and the like, and the primary object is to provide in a simple and practical form a device which will greatly facilitate the tying of bundles and shocks of corn fodder.

Another object is to provide a mechanical tie which may be used as a combination pulley and tie for any purpose where ropes are held in tension.

In the drawings—

Figure 1:
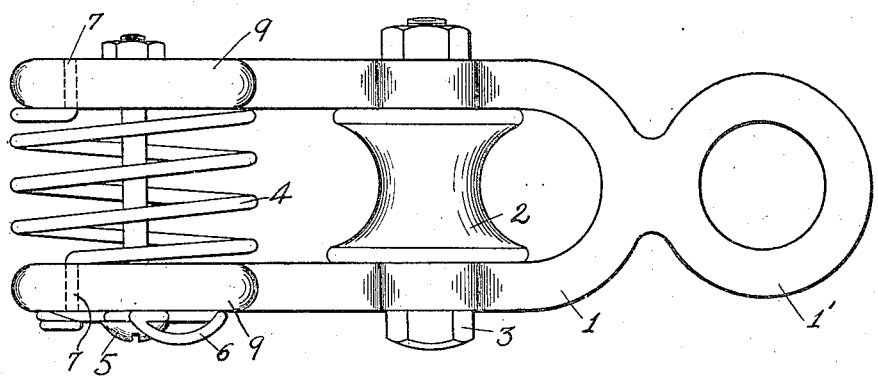
Figure 1 is a plan view of the complete device.
Figure 2:
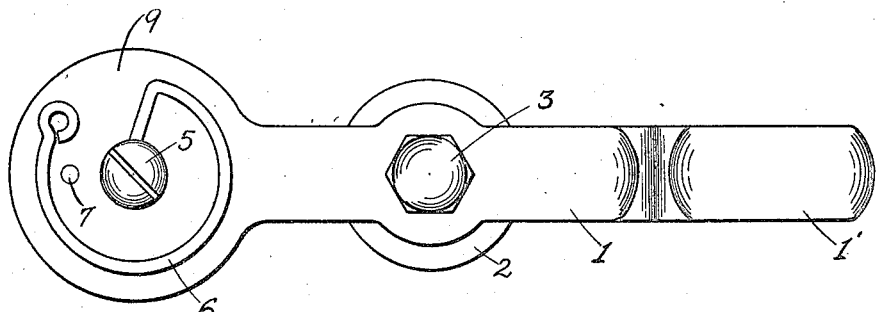
Figure 2 is a side elevation of the tie, illustrating the method of holding the twine holder in position.

In the drawings, 1 illustrates the main frame member of the device shaped in the form of a clevis preferably made of cast steel and in which all the working elements are mounted. The frame 1 comprises at one extremity thereof an eye portion 1' which is formed integral with the body of the frame 1 and which provides a place into which a rope may be conveniently tied. A small rope sheave 2 is mounted for rotation within the clevis part of the frame 1 upon the bolt 3. At the open end of the frame 1, both ends of the clevis jaws respectively are formed into flattened circular plates 9 of approximately the same diameter as the helical spring 4 housed between same. The purpose of these flattened extremities of the frame 1 is to serve as guards for the spring 4 when the tie is subjected to severe usage incident to the actual binding of the fodder. The bolt 5 is passed centrally through the flattened circular portions of the frame 1, and tends to hold the two extending parts together when undue force is acting to bend them apart. The compression spring is mounted over the bolt 5 having same as the axis. The two extremities 7 of the spring are turned outward perpendicular to the convolutions thereof, and are respectively anchored in small holes within the flattened end portions of the frame 1. A twine holder 6 is mounted upon the outer side of the flattened portion of the frame 1, and held securely in position by means of the bolt 5. There may be one of these attachments 6 on either side of the frame 1. This spring element 6 is designed to provide a constant tension between the same and the surface of the frame 1, so that when an object similar to a cord is interposed between same, it will be yieldingly held thereby.

Having described the construction of my device, I now follow out the operation thereof.

Figure 3:
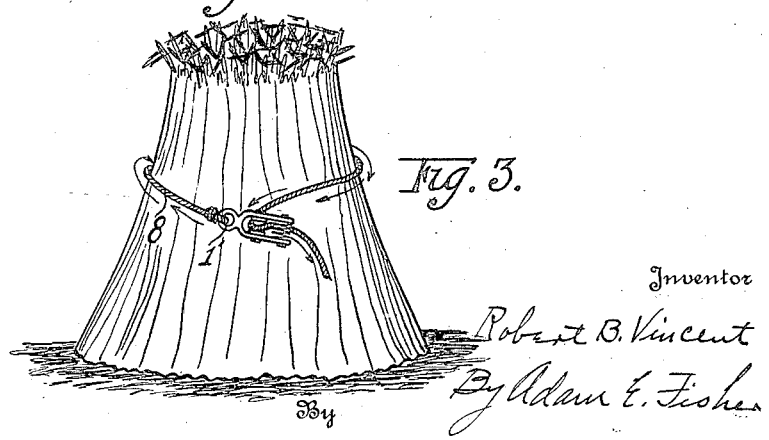
Figure 3 is a diagrammatic view of a corn shock in the process of being tied by means of this invention.

One end of a rope 8 (shown in Figure 3) is fastened to the eye portion 1' of the frame 1, and the other end is then trained around a shock of fodder in the direction of the arrows, as shown in Figure 3; then through the opening between the sheave 2 and the arched part of the frame 1; and then partially circumscribing the sheave 2, the rope emerges between the sheave 2 and the spring 4. A pulley effect may now be gained by pulling on the rope and when the desired tautness is reached, the rope is drawn back through the conventions of the spring 4, by means of which the rope will be held temporarily. Thus after the rope is tightened, the bundle is now ready to be tied permanently. A twine is then taken, one end thereof placed under the holder 6 and the other end carried around the fodder, after which the twine may be tied in the usual manner. Then the rope may be released.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

The combination of a rope pulley and tie, comprising a cast frame having an eye portion on one extremity thereof; a rope sheave mounted for rotation in a central position thereof; a helical compression spring mounted at the other extremity of the frame adapted to coact with the rope and hold same in a locked position; a twine holding device mounted on the outside of the frame adapted to yieldingly hold a cord in position.

ROBERT B. VINCENT.

Witnesses:
 ISSAC L. MARR,
 J. E. YOUNG.